United States Patent Office 3,154,520
Patented Oct. 27, 1964

3,154,520
BORON-SUBSTITUTED SILANES AND
POLYMERS THEREFROM
John A. Dupont and Marion F. Hawthorne, Huntsville, Ala., assignors to Rohm & Haas Company, Philadelphia, Pa., a corporation of Delaware
No Drawing. Filed Oct. 1, 1959, Ser. No. 844,610
15 Claims. (Cl. 260—46.5)

This invention concerns processes for the preparation of high energy boron-containing compounds, the compounds produced by said processes and polymers formed therefrom.

Boron compounds are of particular interest as components of propellant charges, such as are used in missiles, rockets, etc., because they are high energy compounds and, when used with oxidizers and other additives, provide very high specific impulse, a much sought after characteristic. However, the simpler boron compounds tend to be unstable. Stable boron compounds have long been sought.

While it would be possible to incorporate stable boron compounds into propellant compositions without chemically reacting the boron compounds with the other components of the propellant charge, there are serious limitations of the amount of boron-containing compounds which can be incorporated if they do not react to form polymeric compounds with good physical properties. There are definite lower limits to the physical properties which a propellant grain must possess and, because of the necessity for using high proportions of oxidizers such as ammonium perchlorate, many of the propellant grains presently used are not substantially above these minimum requirements. Thus, the addition of any appreciable amount of boron-containing compounds which do not contribute to the physical strength of the grain is frequently impossible. Boron-containing compounds which yield polymers having good physical properties by polymerization or by condensation reactions are, therefore, most desirable.

One preferred method of making propellant "grains" or charges consists in casting a mixture of various additives plus a compound which can be termed a "monomer," which will subsequently form an elastic tough rubbery polymer by condensation or polymerization reactions and function as a binder for the entire propellant charge. This method permits uniform dispersion of all components throughout the propellant mass and, more important, permits casting the mixture into casings or molds at relatively low, safe temperatures. Obviously, with potentially explosive or highly combustible mixtures such as must be used for high energy propellants, the ability to cast these compositions satisfactorily at relatively low temperatures is an important safety facor. After casting, the monomeric compound is reacted to form a polymer, which polymer, as hereinbefore set forth, functions as a binder for the entire propellant charge.

An object of the present invention is to make available stable boron-containing monomers having high boron content which can be polymerized to polymers, which polymers exhibit very desirable properties for use in propellants.

Another object of the present invention is to make available boron-containing monomers with high boron content which can be cast at relatively low, safe temperatures, which monomers can be subsequently polymerized at relatively low temperatures to form tough elastic polymers with good tensile strength, which polymers can function as binders for the entire propellant charge.

Silicone polymers are known in the prior art and are outstanding in their resistance to thermal or oxidative degradation at elevated temperatures. Furthermore, a wide range of physical properties are potentially available in such systems as evidenced by the oils, resins, gums, and "bouncing putty" which have been developed in recent years.

It has now been found that stable boron-containing silanes which have high energy content and which are capable of being polymerized to yield polymers which are resistant to hydrolysis and oxidation can be prepared by the reaction of boron hydrides with substituted silanes. Thus:

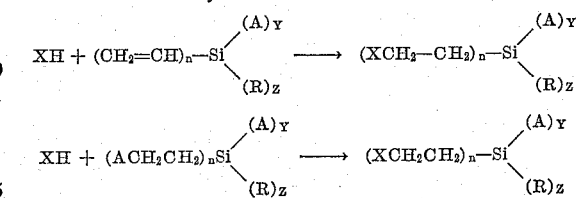

where
X is $B_5H_8$ or $B_{10}H_{13}$,
n is 1 or 2,
R is $CH_3$ or $C_2H_5$,
Y is 2 or 3,
A is Cl or Br, and
Z is 0 or 1.

The boron-containing silanes so produced are distillable oils or low melting crystalline solids which can be hydrolyzed in the absence of base to boron-containing silicone polymers. Copolymers of these boron-containing silanes are not only excellent binders for solid composite rocket propellants from the standpoint of physical properties imparted to the propellant grains, but impart very high energy or specific impulse.

The preferred boron hydrides of the present invention are pentaborane, $B_5H_9$, and decaborane, $B_{10}H_{14}$. Decaborane offers advantages over pentaborane in that it contains higher borane content and so the silanes derived therefrom have higher energy contents and, since decaborane is more stable than pentaborane, it is easier to handle under the reaction conditions employed.

Numerous substituted silanes can be employed for reacting with the boron hydrides, yielding a variety of boron-containing silanes. Suitable substituted silanes include methylvinyldichlorosilane, vinyltrichlorosilane, ethylvinyldichlorosilane, divinyldichlorosilane, (β-chloroethyl)-methyldichlorosilane, (β-chloroethyl(trichlorsilane, (β-chloroethyl)ethyldichlorosilane, and di(β-chloroethyl)dichlorosilane. The corresponding bromo compounds can also be employed but, because of economy and availability, the chloro compounds are preferred.

The reaction between the boron hydrides and the substituted silanes appears to be a Friedel-Crafts type reaction and aluminum chloride is a particularly suitable catalyst. The presence of hydrogen chloride with the aluminum chloride gives particularly good results and represents a preferred embodiment of this invention.

Although theoretically one mole of the boron hydride reacts with one mole of the silane to give the desired product, numerous undesirable side reactions occur if a 1 to 1 molar ratio is employed. It is desired to use an excess of the boron hydride to prevent these undesirable side reactions. The side reactions can be minimized by employing 1.5 moles of boron hydride per mole of silane, and excesses as high as 5.0 moles of boron hydride per mole of silane will still give the desired product. A preferred embodiment employs 2 moles of boron hydride per mole of silane. Since the excess of unreacted boron hydride is sublimable, it can be readily removed and recovered from the reaction mixture.

The amount of aluminum chloride used over the required minimum is not critical, and using the preferred embodiment of 2 moles of boron hydride to 1 mole of silane, from about 0.3 to about 1.0 mole of aluminum chloride can be used. A preferred embodiment uses 5.0 mole aluminum chloride to 2 moles of boron hydride and 1 mole of silane.

As set forth hereinbefore, the preferred catalyst is a mixture of aluminum chloride and hydrogen chloride. The concentration of hydrogen chloride above the required minimum does not appear to be critical and can be controlled by bubbling dry hydrogen chloride through the reaction mixture as hereinafter set forth, until the addition of the boron hydride to the silane is complete.

A solvent is employed in the preferred embodiment of this invention and said solvent must be inert, i.e. non-reactive with the reactants and the product. Carbon disulfide is particularly suitable since aluminum chloride has negligible solubility therein, and, when the reaction is complete, the aluminum chloride can be removed from the reaction mixture by filtration.

The reaction must be conducted under substantially anhydrous conditions which requires pre-drying of all reactants and the solvent and suitably protecting the reaction mixture from moisture.

The reaction should be run in the absence of oxygen and is generally run under an inert gas such as nitrogen or helium.

The reaction should be carried out at a temperature of from about 15° C. to about 50° C., with a preferred range of 20° C. to 25° C.

The reaction is carried out by dissolving the decaborane in carbon disulfide, adding the aluminum chloride thereto, bubbling in dry HCl, and adding the silane. When the addition of the silane is complete, the flow of the HCl is stopped. The aluminum chloride is then removed by filtration, the carbon disulfide is removed by distillation, and the monomer is purified by distillation in vacuo.

The boron-containing substituted silanes of the present invention can be readily hydrolyzed to high molecular weight polymers. Modifications of the polymer system can be effected by incorporating non-boron-containing alkylchlorosilanes before hydrolysis. By means of such modifications, a variety of polymers can be produced which are of value as high energy additives, binders or plasticizers.

Complete and relatively rapid hydrolysis of the boron-containing chlorosilanes or mixtures thereof can be effected by prolonged exposure to moist air with adequate stirring or by treatment of a solvent solution of the silane, e.g. a solution in methylene chloride, with water.

The properties of the polymers may be further modified in two additional ways. The addition of dimethyldichlorosilane to the "monomers," i.e. the boron-containing substituted silanes, prior to hydrolysis, exerts a plasticizing effect, the amount of softening being proportional to the amount of dimethyldichlorosilane added. Depending on the particular properties desired, from about 10% to about 40% of dimethyldichlorosilane, based on the weight of the boron-containing silane, is employed.

The length of the polymer chain can also be controlled by the addition, prior to hydrolysis, of trimethylchlorosilane which functions as a "chain stopper." The amount required to effect the desired degree of chain stopping depends to a large extent on the specific silane employed and the intended use, but from 10% to 50% of trimethylchlorosilane on the weight of the boron-containing substituted silane is a satisfactory range. The oils so produced burn vigorously with a green flame upon ignition, but are thermally stable. Heating at 150° C. in vacuo for extended periods of time produced only slight discoloration of the clear sample and there was no apparent change in viscosity.

Compounds containing two or more nitrile groups, such as adiponitrile, can react with the polymers which are formed on hydrolysis to form cross-linked structures. However, gassing occurs during the cross-linking reaction which causes the formation of a porous structure. This restricts the use of this cross-linking reaction in the manufacture of propellant grains since dense, non-porous structures are essential in most propellant grains. From about 0.3% to about 10% of the dinitrile on the weight of the polymers gives sufficient cross-linking to decrease the thermoplasticity appreciably.

A typical preparation of a boron-containing substituted silane and the hydrolysis of said silane to form the polymer is as follows:

Methylvinyl dichlorosilane was prepared by the reaction of vinylmagnesium chloride (from vinyl chloride) with methyltrichlorosilane. This compound was added to a mixture of decaborane (100% excess) and aluminum chloride in carbon disulfide at room temperature to produce 41% conversion and 93.5% yield ($\beta$-decaboranylethyl)methyl dichlorosilane.

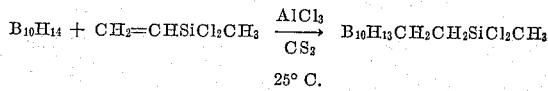

$$B_{10}H_{14} + CH_2\!\!=\!\!CHSiCl_2CH_3 \xrightarrow[CS_2]{AlCl_3} B_{10}H_{13}CH_2CH_2SiCl_2CH_3$$

25° C.

The product was an oil which was distilled in the molecular still (150° C. at $10^{-3}$ mm.). The analysis and infrared spectrum were in agreement with the proposed structure.

($\beta$-decaboranylethyl)methyl dichlorosilane was hydrolyzed by stirring in moist air. As the polymerization progressed, the material grew more viscous, then rubbery, and finally set to a brittle white solid. The polymer was degassed by pumping in vacuum and analyzed. The theoretical amount of boron (51.9%) and silicon (13.5%) were found to be present. The polymer was soluble in common organic solvents, such as ether, ethyl acetate, and methylene chloride, and could be precipitated from these solvents by adding pentane. Pyridine produced a dark red solution characteristic of decaborane.

The polymer was thermoplastic and could be converted into a transparent colorless resin by heating to about 80° C. Water and oxygen had no effect on the polymer at ambient temperature.

Small pellets of the polymer (27%) mixed with ammonium perchlorate (73%) were prepared using a 20,000 p.s.i. pellet press and burned at pressures of 500 and 1000 p.s.i. under nitrogen. Burning rates were 1.2 and 1.7 in./sec., respectively and the pressure exponent was 0.45. Impact sensitivities were determined on the powdered oxidizer-fuel mixture; 50% fire height was 4–6 in. with a one kilogram weight.

The following examples set forth certain well-defined embodiments of the application of this invention. They are not, however, to be considered as limitations thereof, since many modifications may be made without departing from the spirit and scope of this invention.

Unless otherwise specified, all parts are by weight. All temperatures are centigrade unless otherwise stated.

*Example I*

To a stirred mixture of 40.0 grams of anhydrous aluminum chloride, 750 ml. of dry carbon disulfide, and 200 grams (1.64 moles) of decaborane, was added slowly at room temperature 100 grams (0.709 mole) of methylvinyldichlorosilane. The mixture was stirred overnight, filtered, and the carbon disulfide removed by distillation. The flask containing the oily residue was attached to a vacuum line and 135 grams (1.11 moles) of decaborane was recovered by sublimation. The residue was distilled in high vacuum ($1 \times 10^{-3}$ mm.) to yield 139 grams (75%) of ($\beta$-decaboranylethyl)methyl dichlorosilane. This represents a 100% yield of decaborane product when the recovered decaborane is accounted for. *Analysis.*—Calculated for $B_{10}H_{20}C_3SiCl_2$: B, 41.1; Si, 10.7; C, 13.7; H, 7.6. Found: B, 40.7; Si, 10.42; C, 11.67; H, 7.8.

The liquid monomer (30.0 grams) was dissolved in 100 ml. of methylene chloride and shaken with three 200 ml. portions of water. The organic layer was dried and the solvent evaporated to yield a soluble linear resin.

Example II

Into a 100 cc. seal-off bulb, equipped with a fragile breakoff, containing 12.0 grams (98.2 moles) of decaborane and 3.0 grams of anhydrous aluminum chloride, was transferred under high vacuum 3.87 grams (25.1 moles) of divinyldichlorosilane, 75 cc. of carbon sulfide, and approximately 1.0 cc. (STP) of anhydrous hydrogen chloride. The reaction bulb was then sealed off at liquid nitrogen temperature (−196° C.), allowed to warm to room temperature and heated in a hot-air bath to 60° to 70° C. for approximately 11 hours. The bulb was opened under high vacuum and the solution filtered. The carbon disulfide was then distilled followed by subsequent removal of decaborane by sublimation. The product which remained was a light orange colored, viscous liquid which fumed slightly in air and hydrolyzed to a white solid. *Analysis.*—Calculated for $B_{20}H_{34}C_4SiCl_2$: B, 54.4; Si, 7.1; Cl, 17.8. Found: B, 52.3; Si, 7.8; Cl, 18.0.

Example III

To a 50 cc. seal-off bulb, equipped with a fragile breakoff, and containing 0.9 gram of anhydrous aluminum chloride was transferred under high vacuum 0.71 gram (11.2 moles) of pentaborane and 1.82 grams (11.2 moles) of vinyltrichlorosilane. The reaction bulb was sealed off at −196° C. (liquid nitrogen) and allowed to warm to room temperature, after which it was heated in a hot-air bath at 60° to 70° C. for 17 hours. The bulb was opened under high vacuum and the unreacted pentaborane and vinyltrichlorosilane were removed. The liquid which remained was distilled into a trap maintained at 0° C. where it crystallized in well-defined needles which melted at 6° to 8° C. A 50% yield was realized based on recovered starting materials. *Analysis.*—Calculated for $B_5H_{12}C_2SiCl_3$: B, 24.1; Cl, 47.4. Found: B, 25.8; Cl, 50.5.

To a wells-tirred mixture of methylene chloride and water was added a solution consisting of 14.65 grams (β-decaboranylethyl)methyldichlorosilane, 3.40 grams of trimethylchlorosilane and 10 cc. of methylene chloride over a period of one minute. After stirring for 15 minutes, the methylene chloride layer was separated and dried over anhydrous magnesium sulfate. Upon removal of the solvent, the liquid copolymer was placed in a test tube and heated under vacuum at approximately 150° C. for 24 hours. The resulting slightly opaque, viscous liquid was allowed to cool, whereupon it set to a hard resinous solid.

Example IV

HYDROLYTIC POLYMERIZATION OF $(B_{10}H_{13}CH_2)(CH_3)SiCl_2$

Approximately 3.0 grams of pure (β-decaboranylethyl)methyldichlorosilane was poured into an open dish and allowed to react with atmospheric moisture. Hydrolysis took place on the surface of the liquid so that it was necessary to provide constant stirring. As hydrolysis proceeded the consistency of the material gradually became thicker (rubbery) and finally set to a hard brittle white solid (HCl was constantly given off). The resulting solid had practically no odor reminiscent of decaborane. To insure complete hydrolysis, the material was subsequently exposed to water vapor, in vacuum, for a short period of time (10 min.) Infrared ($CH_2Cl_2$ sol.) of this material showed C—H, B—H and B—H bridge absorptions. No—OH absorption appeared in the spectrum. Analytical data were as follows. *Analysis.*—Calculated for $B_{10}H_{20}SiO$: B, 50.9; Si, 13.5; Cl, 0. Found: B, 50.77; Si, 13.0; Cl, 1.46.

Example V

Into a 100 cc. reactor flask (equipped with a seal-off constriction and magnetic break-off) was placed 5.80 grams (47.4 mmoles) of $B_{10}H_{14}$ and 3.13 grams of anhydrous $AlCl_3$ (transferred in dry box under helium). 3.00 cc. (17.3 mmoles) of vinyltrichlorosilane were transferred, via vacuum, to the flask followed by approximately 22.0 cc. (1.0 mmoles) of dry HCl. Approximately 40 cc. of $CS_2$ (dried over $CaCl_2$) was transferred in the vacuum line to the reaction flask which in turn was sealed off at liquid $N_2$ temperatures. The flask was allowed to reach room temperature and was then placed in a hot air heater at 50° to 60° C. for 8 hours. At the end of this heating period, the liquid turned a light brown color while a slight amount of brown residue had formed on the reactor walls. The flask was allowed to stand at ambient temperatures over the weekend (approximately 60 hours).

After opening the flask under vacuum, the $CS_2$ was distilled, followed by sublimation into an interventing 0° C. trap, of the excess $B_{10}H_{14}$ at a temperature of approximately 60° C. The impure and slightly wetted $B_{10}H_{14}$ recovered amounted to 3.49 grams.

The reactor flask was then removed from the sublimation apparatus under a stream of dry helium and immediately placed on a filtration apparatus and evacuated. Approximately 25 to 30 cc. of pentane (dried over $LiAlH_4$) was distilled into the reaction flask and the resulting solution was filtered into a receiving 50 cc. flask. The pentane was removed by pumping, leaving a viscous, clear, slightly brown liquid. The flask containing this material was removed under a stream of helium, transferred to the dry box, and the liquid was transferred to a weighed stoppered flask. The weight of the crude product was 4.02 grams. The infrared spectra showed strong B—H and light C—H absorption. A preliminary boron analysis showed 47% boron present.

Example VI

Into a 250 cc., three-necked, flask equipped with a mechanical stirrer and a dropping funnel, previously flushed with dry nitrogen, was placed 20.0 grams (0.16 mole) of decaborane, 6 grams of anhydrous aluminum chloride, and 150 cc. of dried carbon disulfide. To this solution was slowly added 12 grams (0.063 mole) of (β-chloroethyl)ethyldichlorosilane over a thirty minute period. The reaction was stirred for approximately four hours, and then allowed to stand at room temperature overnight. The solution developed an orange color characteristic of most decaborane alkylation reactions. On workup, 11.0 grams of a pure, water-white liquid was obtained (analytical results given below) along with 12.4 grams of decaborane. Analysis.—Calculated for $$B_{10}H_{22}C_4SiCl_2$$

B, 39.00; Si, 10.12. Found: B, 40.82; Si, 10.38.

This represents a 63% conversion, assuming the expected product, with a 98.4% yield based on recovered decaborane. The infrared spectrum was identical to that of (β-decaboranylethyl)methyldichlorosilane with the exception of slight shifts in minor absorptions in the fingerprint region.

SOLUTION POLYMERIZATION OF (β-DECABORANYL-ETHYL)METHYLDICHLOROSILANE

Approximately 15.0 grams of pure (β-decaboranylethyl)methylchlorosilane dissolved in 30 cc. of dry methylene chloride was placed in a dropping funnel and added to a well-stirred mixture of 50 cc. of methylene chloride and 50 cc. of ice water over a period of two minutes. The solution was then stirred for an additional fifteen minutes followed by the separation and drying (anhydrous $MgSO_4$) of the methylene chloride. The solution was transferred to a one-liter flask and the solvent removed using a roto-vacuum stripper. The flask was placed on the vacuum line and the remaining solvent was removed slowly followed by a mild heating with a hot air blower. The majority of the resulting solid was removed by scraping from the walls of the flask. A boron analysis of this material showed 51.8% boron (calc. 51.9).

COPOLYMERIZATION OF (β - DECABORANYLETHYL) METHYLDICHLOROSILANE WITH DIMETHYLDICHLOROSILANE

Ten cc. of (β-decaboranylethyl)methyldichlorosilane and 3 cc. of dimethyldichlorosilane were admixed and polymerized in the usual manner. Upon removing the majority of the methylene chloride, the sample was transferred with heating to a standard taper test tube and heated under vacuum at 100° C. for one hour. After cooling, the material was removed by breaking the tube.

We claim:

1. Boron-containing substituted silanes of the formula

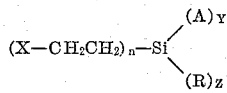

in which
  X is selected from the group consisting of $B_5H_8$ and $B_{10}H_{13}$,
  A is selected from the group consisting of Cl and Br,
  R is selected from the group consisting of $CH_3$ and $C_2H_5$,
  $n$ is an integer from 1 to 2,
  Y is an integer from 2 to 3, and
  Z is an integer from 0 to 1.

2. (β-Decarboranylethyl)trichlorosilane.
3. (β-Decarboranylethyl)methyldichlorosilane.
4. Bis(β-decarboranylethyl)dichlorosilane.
5. Bis(β-chloroethyl)dichlorosilane.
6. Polymers prepared by the hydrolysis of the silanes as set forth in claim 1.
7. Polymers prepared by the hydrolysis of the silanes as set forth in claim 1 in admixture with from about 10% to about 40% by weight of dimethyldichlorosilane.
8. Polymers prepared by the hydrolysis of the silanes as set forth in claim 1 in admixture with from about 10% to about 50% by weight of trimethylchlorosilane.
9. A polymer prepared by the hydrolysis of the compound of claim 2.
10. A polymer prepared by the hydrolysis of the compound of claim 3.
11. A polymer prepared by the hydrolysis of the compound of claim 4.
12. A process for the preparation of boron-containing silanes which comprises reacting in the presence of a Friedel-Crafts reagent at a temperature of from about 15° C. to about 50° C. a boron hydride selected from the group consisting of pentaborane and decaborane with a silane of the formula:

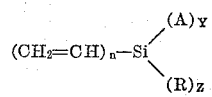

in which
  $n$ is an integer from 1 to 2,
  A is a halogen with an atomic number from 17 to 35,
  Y is an integer from 2 to 3,
  R is a lower alkyl selected from the group consisting of methyl and ethyl, and
  Z is an integer from 0 to 1, and recovering the boron-containing silane from the reaction mixture.

13. A process as set forth in claim 12 in which Friedel-Craft reagent is a mixture of aluminum chloride and hydrogen chloride.
14. A process as set forth in claim 12 in which the molar ratio of boron hydride to silane is two to one.
15. A process as set forth in claim 12 in which the reaction is conducted in a carbon disulfide solution.

References Cited in the file of this patent

UNITED STATES PATENTS

| | | |
|---|---|---|
| 2,831,009 | Seyforth | Apr. 15, 1958 |
| 2,927,938 | Cohen et al. | Mar. 8, 1960 |